(12) United States Patent
Harris

(10) Patent No.: US 6,552,512 B1
(45) Date of Patent: Apr. 22, 2003

(54) PORTABLE DEVICE CHARGER BASED ON AUDIO ENERGY POWER

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 0 days.

(21) Appl. No.: 09/682,014

(22) Filed: Jul. 10, 2001

(51) Int. Cl.$^7$ .................................................. H02J 7/00
(52) U.S. Cl. ...................................... 320/107; 320/137
(58) Field of Search .............................. 320/107, 137, 320/114; 307/150

(56) References Cited

U.S. PATENT DOCUMENTS 5,889,383 A * 3/1999 Teich .......................... 320/107

* cited by examiner

*Primary Examiner*—Gregory J. Toatley, Jr.

(57) ABSTRACT

A device for receiving audio signal from an audio source, and converting said audio signal into DC power to be used to recharge a portable device. The portable device may be for example a PDA, or laptop or cellular phone. The power from the audio signal is rectified, and may be DC to DC converted in order to produce a specified DC level. That value is then used to charge the portable device.

15 Claims, 1 Drawing Sheet

PORTABLE DEVICE CHARGER BASED ON AUDIO ENERGY POWER

BACKGROUND OF THE INVENTION

Use of portable devices is very common. The portable devices commonly operate using rechargeable batteries. Rechargeable batteries can be very convenient, since the user need not continually purchase batteries for use in such a device. However, when the user is not near the usual place where they recharge their device, charging of the device may become more challenging.

Some airplanes and other common carriers may include dedicated plug in receptacles, intended for plugging in and recharging elements for laptops and the like. Not all, however, will have such provision.

SUMMARY OF THE INVENTION

The present application teaches a portable device recharger, which may operate by obtaining the recharging power from the audio power that is available in an airplane or other common carrier.

BRIEF DESCRIPTION OF THE DRAWINGS

These and other aspects will now be described in detail with reference to the accompanying drawings, wherein.

DETAILED DESCRIPTION

Figure 1:
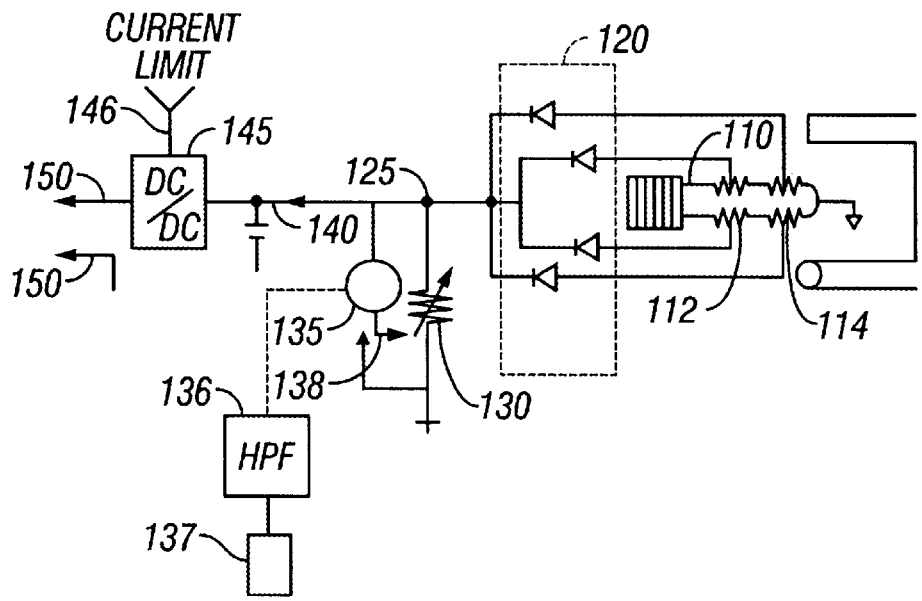
FIG. 1 shows a basic diagram of the first embodiment of the system.

An embodiment is shown in FIG. 1. The FIG. 1 embodiment is intended for obtaining recharge power from an audio device receptacle, e.g. a headphone jack. Such headphone jacks are commonly included in airplanes, trains, and other common carriers, to provide audio entertainment for the passenger.

Initially, it should be understood that these devices may not produce sufficient power to totally power certain portable devices, e.g. laptops. The user should increase the volume control to its maximum setting. Even so, this will not power a running laptop, which may require 10 watts or more. Still, this may be of some use. First of all, this may form a battery assist. In addition, the user usually does not use the laptop or other device full time. There are times when the user for example will not use the device, e.g., while they eat or sleep. During those times, the battery can be recharge, so that at least some battery charge will be replenished in the device.

A headphone jack 100 is shown, and the plug 110 is shown for plugging into the headphone jack. The plug 110 as shown includes first connection 112 and second connection 114 intended for the stereo connections.

The power output which is usually used to drive the headphones, has some power capacity. This power may be less than 1 watt, or may be as high as three or four watts. Whatever power is provided is first rectified by a half wave or full wave rectifier circuit 120, to provide a rectified voltage at node 125. This rectified voltage may be provided across a load resistor 130, and this load resistor 130 may be variable to accommodate different impedances in the headphone jack 100. An additional circuit is a clip detector shown as 135, which may simply be a high pass filter 136, attached to a power detector 137. In the embodiment shown, the clip detector detects when the output is being too heavily driven and therefore clipping the output audio signal. This can signify that the circuit is being driven to hard, and may signal via 138 the load resistor 130 to be lowered. In another embodiment, however, the clip detector is totally unnecessary, and is simply omitted. The output voltage is also smoothed via capacitor 140, and applied to a DC to DC converter module 145. This may be a single chip circuit. A current limit signal 146 may limit the amount of current that is produced by the DC to DC converter. The output voltage 150 may correspond to a few watts of output power, which can be used to charge any portable device such as a laptop, PDA, cell phone, or any other portable device using rechargeable batteries. Once again, the operation is based on the power that is intended to be provided for an audio output.

Figure 2:
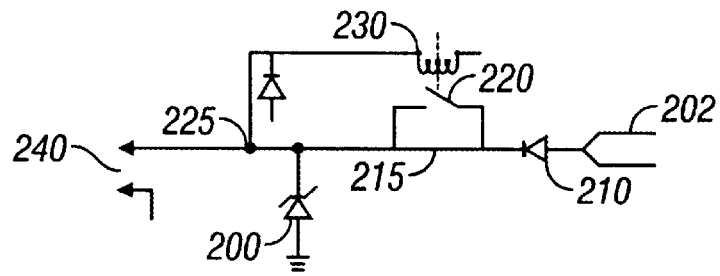
FIG. 2 shows a second embodiment with more simplified structures.

In an alternative embodiment, shown in FIG. 2, a more simplified circuit is used. Instead of using a DC to DC converter, a zener diode 200 is used as the voltage regulating element. The power from 202 is still obtained from the headphone jack, rectified at 210, and applied to the zener diode. In this embodiment, however, soft start circuit may be desirable in order to avoid overcurrent occurring in the zener diode at startup. Accordingly, a series resistor 215 may be provided, with a switch 220 in parallel with the resistor. When the output voltage 225 reaches a certain level, the coil 230 is energized, thereby closing the switch 220.

Again, the output voltage 240 may be used to power a any portable device.

Figure 3:
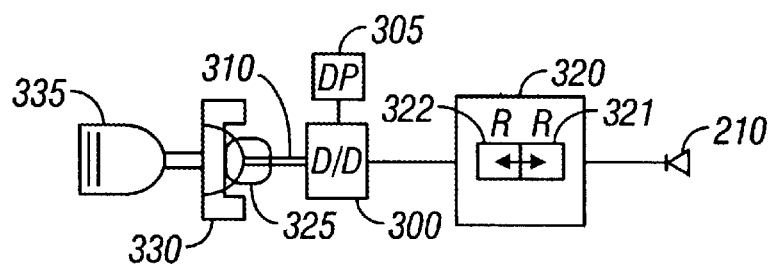
FIG. 3 shows a third embodiment with interchangeable connectors and a display.

According to another embodiment shown in FIG. 3, the output of the rectifier circuit 210 is again regulated by at DC to DC converter, here 300. This DC to DC converter is programmable, and an array of dip switches 305 is used to set the voltage that will be output 310 from the DC to DC converter. This allows the unit to operate over a plurality of different output voltages. As described above, this system is intended to output at most a few watts. This may be very useful for charging a cell phone or PDA. However, when used with a laptop, even tho some charging will occur, it cannot be expected to totally power the laptop. Accordingly, a display 320 is provided. The display includes a green side 321 and a red side 322. A bar is located in the mid portion of the bar graph. When in the green side, it indicates that more power is being produced than is being used, i.e. the laptop is being charged. In contrast, when the bar is on the red side, more power is being consumed then produced. This means that even though the device is being powered, it is still using power from the battery in addition to that power from the powering cord. When the display reaches far left, it means that no power at all is being provided by the power cord, and the laptop is on full battery discharge. In this embodiment, the output power is produced in a connector 325 which may be a standard barrel type connector. In addition, other connectors can be plugged into the barrel type connector 325. For example, a plug 330 may lead to a short cord between that plug mating to the connector 325, and a recharger plug 335 for a specified cell phone. In this way, by plugging in the plug 335, the cell phone can be recharged.

While the above has described the power being provided by an audio source, it should be understood that other sources of the power, which are not sufficient to totally power the device during times of peak power consumption, may alternatively be used. For example, the source of power may be provided by a turbine driven by the flow of air, or from a light driven "solar" cell. All such modifications are intended to be encompassed within the following claims, in which.

What is claimed is:

1. A device, comprising:
   a connector, of a size which connects to an audio source which provides an audio signal for an audio playing device;
   an operation circuit, changing a signal received from said audio source into DC power, and producing a DC output.

2. A device as in claim 1, further comprising a second connector, providing said DC output in a specified connector form.

3. A device as in claim 1, wherein said operation circuit includes a DC to DC converter.

4. A device as in claim 1, wherein said operation circuit includes a zener diode.

5. A device as in claim 1, wherein said operation circuit includes a soft start circuit, which limits an amount of current that is delivered until a specified output voltage level is reached.

6. A device as in claim 1, wherein said operation circuit includes a rectifier circuit.

7. A device as in claim 2, wherein said second connector has an interchangeable form.

8. A circuit, comprising
   a rectifier part, receiving an electrical signal representing an audio signal from an audio source of a format for playing over audio hardware, and rectifying said audio signal from said audio source; and
   a DC to DC converter circuit, which receives the rectified audio signal from said rectifier part, and produces an output signal of a desired DC level.

9. A circuit as in claim 8, further comprising a clip detector circuit, detecting a state of clipping of said output signal.

10. A circuit as in claim 8, further comprising a display element, indicating an amount by which a driven device is either being charged or discharged, when connected.

11. A method, comprising:
    receiving an audio signal from an audio circuit from a connector that is sized to receive an audio headset plug;
    rectifying said audio signal to produce a rectified DC output at a specified and desired DC level; and
    using said DC level output to provide power to a portable device.

12. A method as in claim 11, wherein said receiving an audio signal comprises plugging into a headphone jack.

13. A method as in claim 12, further comprising, instructing a user to increase an output volume to a maximum level.

14. A method as in claim 11, further comprising displaying a state of charge or discharge of said portable device.

15. A device as in claim 1, wherein said connector is in the shape of an audio headphone jack.

* * * * *